Oct. 27, 1953
C. L. THAYER
2,656,860
MITER BOX FOR PORTABLE POWER SAWS
Filed Feb. 15, 1952
3 Sheets-Sheet 1
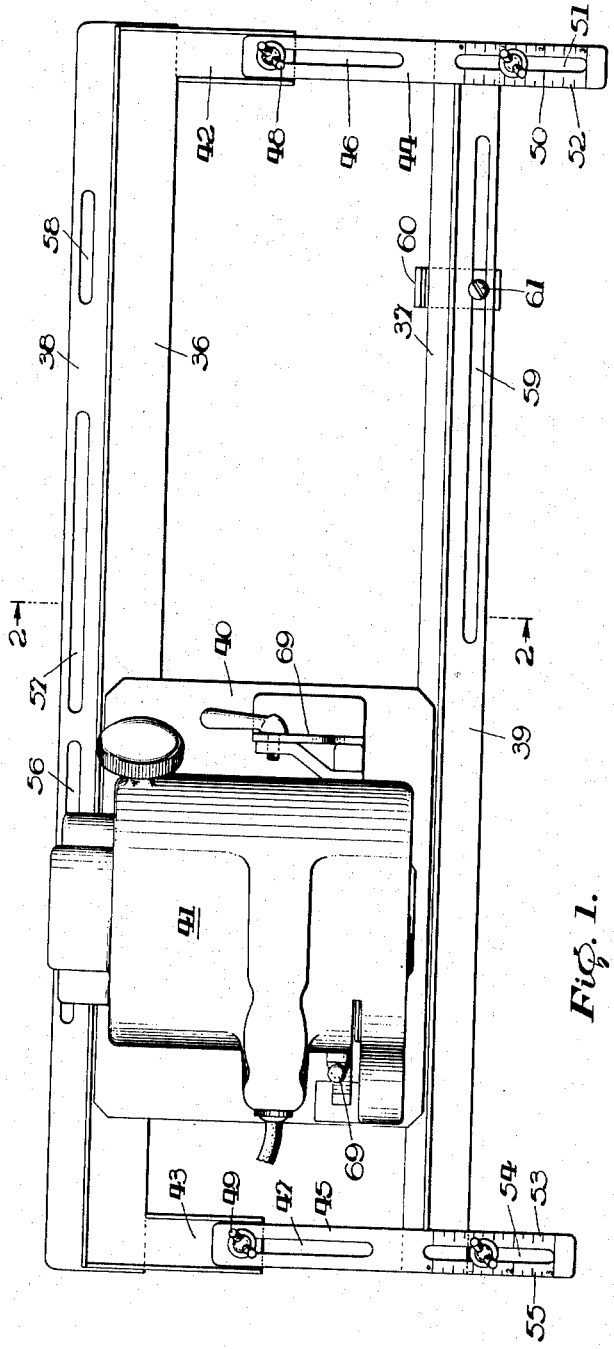
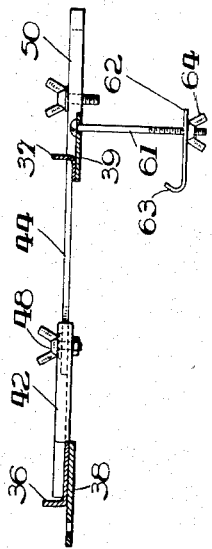
INVENTOR
Chester L. Thayer
BY
Cameron, Kerkam & Sutton
ATTORNEYS Oct. 27, 1953 C. L. THAYER 2,656,860
MITER BOX FOR PORTABLE POWER SAWS
Filed Feb. 15, 1952 3 Sheets-Sheet 2

INVENTOR
Chester L. Thayer
BY
Cameron, Kerkam & Sutton
ATTORNEYS

Oct. 27, 1953
C. L. THAYER
2,656,860
MITER BOX FOR PORTABLE POWER SAWS
Filed Feb. 15, 1952
3 Sheets-Sheet 3
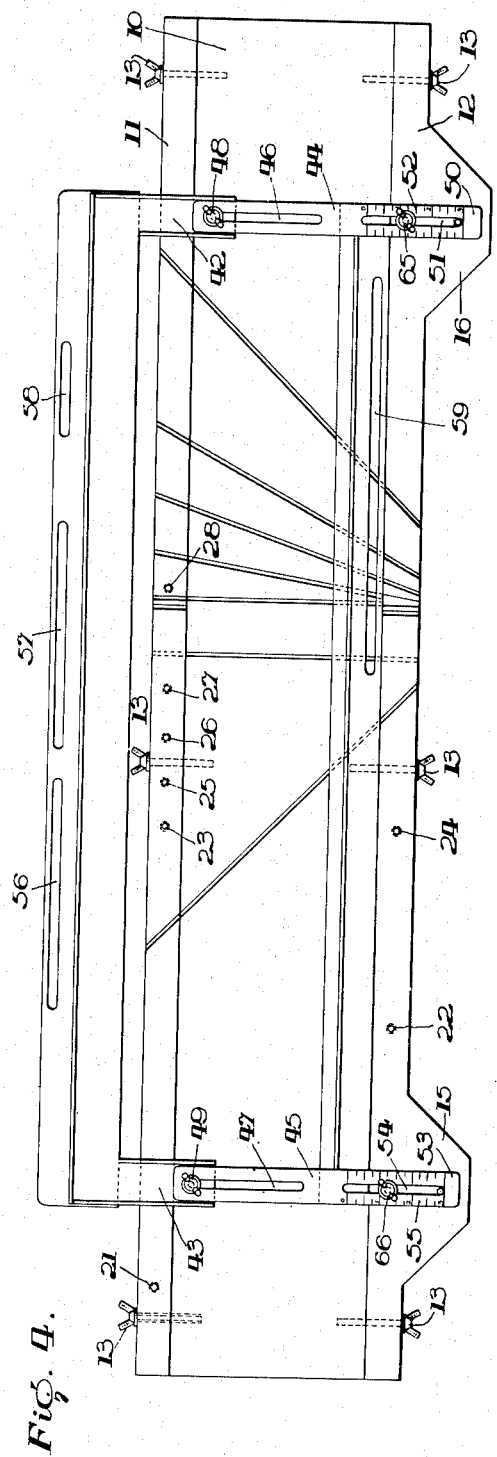
INVENTOR
Chester L. Thayer
BY
Cameron, Kerkam & Sutton
ATTORNEYS Patented Oct. 27, 1953

2,656,860

UNITED STATES PATENT OFFICE 2,656,860

MITER BOX FOR PORTABLE POWER SAWS

Chester L. Thayer, Memphis, Tenn.

Application February 15, 1952, Serial No. 271,699

2 Claims. (Cl. 143—6)

This invention relates to miter boxes for portable power saws and more particularly to such miter boxes which may be employed not only for cutting at various angles across the length of the material to be cut but may also be used for ripping along the length of the material to be cut.

Heretofore various devices have been proposed for holding portable power saws at various angles of cut across the length of material to be cut and also for ripping such material. These prior devices are for the most part complicated in construction and expensive to manufacture.

It is accordingly an object of the present invention to provide a novel miter box for portable power saws which is relatively simple to manufacture and of relatively cheap construction.

Another object of the present invention is to provide such a miter box which can be used for various angles of cut across the length of the material to be cut and which may also be used for ripping along the length of such material.

Another object is to provide such a novel miter box which may be adjusted for various thicknesses of cut both across and along the length of the material to be cut.

Another object is to provide such a novel miter box which is of such simple construction that it may be readily made by the unskilled without requiring expensive tooling.

Other and further objects of the present invention will appear from the following description of an illustrative embodiment of the same.

The miter box of the present invention is capable of various mechanical embodiments one of which is shown in the accompanying drawings and is described hereinafter for purposes of illustration. This illustrative embodiment of the present invention should in no way be construed as defining or limiting the same and reference should be had to the appended claims to determine the scope of the invention.

In the accompanying drawings, in which like reference characters indicate like parts, Fig. 1 is a view from above of an embodiment of the novel guide member used with the miter box of the present invention showing a portable power saw in position thereon; showing the means employed for adjusting the guide member for various sizes of portable power saws; and showing the slots employed for securing the guide member in various positions including the ripping position;

Fig. 2 is a cross sectional view of the guide member of Fig. 1 on the line 2—2 thereof;

Fig. 4 is a view from above of an illustrative embodiment of the miter box of the present invention with the guide member in position for ripping along the length of the material to be cut; and Fig. 5 is an end view of the miter box of Fig. 4 with a portable power saw mounted in the guide member for ripping along the length of the material to be cut.

Figure 3:
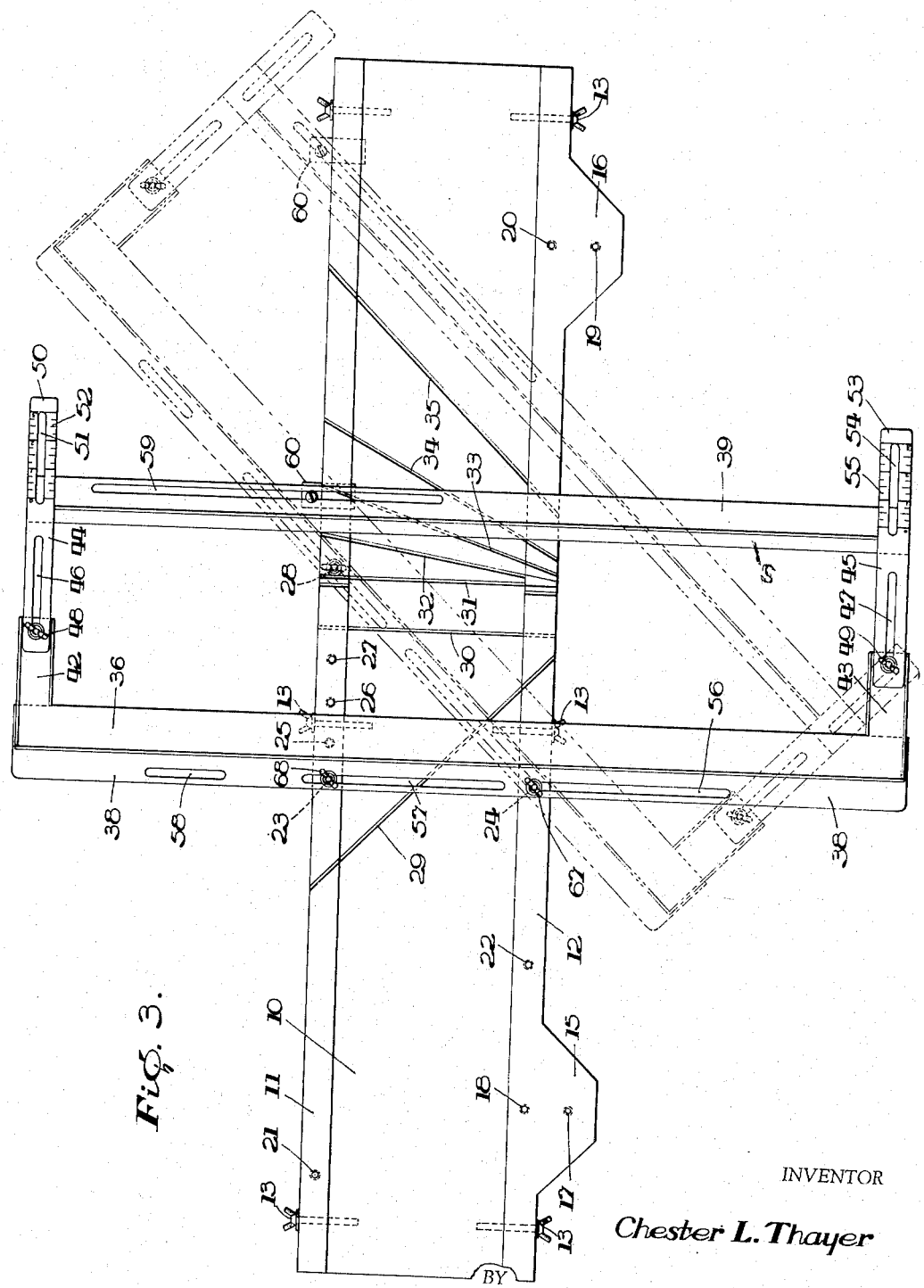
Fig. 3 is a view from above of an embodiment of the miter box of the present invention with the novel guide member secured in position thereon for a 90° cut across the length of the material to be cut and showing, in dotted lines, the guide member in position for a 45° cut across the length of the material to be cut.

Referring now more particularly to Figs. 1, 2 and 3, the illustrative embodiment of the miter box of the present invention there comprises a box of more or less conventional design made of any suitable material such as wood or metal and having a bottom 10 and side walls 11 and 12. Side walls 11 and 12 are removably secured to the bottom 10 as by lag bolts 13 provided with wing nuts to facilitate releasing and tightening these bolts. A plurality of closely spaced and aligned holes 13' are provided in side walls 11 and 12 for each of lag bolts 13, as seen in Fig. 5, so that the height of side walls 11 and 12 above the bottom 10 may be readily adjusted to determine the depth of cut of the saw blade in the material to be cut. Scales 14 are provided on the ends of walls 11 and 12 for an accurate determination of the heights of walls 11 and 12 above the base 10.

Side wall 12 is provided with extensions 15 and 16 for purposes which will more fully appear hereinafter. Extension 15 and the adjacent portion of side wall 12 are provided with a pair of internally threaded holes 17 and 18 which are aligned at right angles to the long axis of the miter box. Extension 16 and the adjacent portion of side wall 12 are provided with internally threaded holes 19 and 20 aligned at right angles to the long axis of the miter box. Holes 17, 18, 19 and 20 are used to secure the saw guide member for ripping along the length of the miter box as shown in more detail in Fig. 4.

Side walls 11 and 12 are provided with internally threaded holes 21 and 22 a plane common to the axes of which is aligned at a 45° angle to the long axis of the miter box. Side walls 11 and 12 are also provided with a pair of internally threaded holes 23 and 24 aligned at right angles to the long axis of the miter box and designed to hold the saw guide member for a 90° cut across the length of the material to be sawed. The top of side wall 11 is also provided with holes 25, 26, 27, and 28 which are aligned with hole 24 respectively at angles of 80°, 70°, 60° and 45° with the long axis of the miter box. The guide member for the power saw may therefore be pivoted about hole 24 and secured at each of the holes 25, 26, 27, and 28 to provide cuts across the length of the material to be cut at angles of 80°, 70°, 60°, and 45°, respectively.

Side walls 11 and 12 and bottom 10 are suitably slotted at 29, 30, 31, 32, 33, 34, and 35 to permit passage of the saw blade through walls 11 and 12 and into bottom 10 for any of the angles at which the saw guide member may be set.

The guide member for the portable power saw is shown in detail in Figs. 1 and 2. This guide member comprises angle members 36 and 37 suitably secured, as by welding, to base plates 38 and 39 respectively, thus forming a pair of tracks within the base plate 40 of any suitable portable power saw 41 may slide. The tracks provided by angle members 36 and 37 secured respectively to plates 38 and 39 are maintained in adjustable parallel relationship by means of channels 42 and 43 formed integrally with or otherwise suitably secured to angle member 36 at opposite ends thereof and at right angles to the long axis thereof. Bars 44 and 45 are suitably secured at right angles to and at opposite ends of angle member 37 and base plate 39 and are received in channels 42 and 43 respectively. Bar 44 is slotted at 46 and bar 45 is slotted at 7 to receive wing bolts 8 and 9 respectively which are suitably threaded into the bottom of channels 42 and 43 respectively. By loosening wing bolts 48 and 49 angle member 37 may be moved toward or away from angle member 36 to receive any width of base plate 40 of portable power saw 41.

Bar 44 is provided with an extension 50 which is suitably slotted at 51 and is provided with a suitable scale 52 for use when the guide member is in ripping position. Bar 45 is provided with a suitable extension 53 which is slotted at 54 and is provided with a suitable scale 55, also for use when the guide member is in ripping position.

Base plate 38 is provided with three longitudinally disposed slots 56, 57, and 58 to receive the wing bolts employed in holding the guide member in position for various angles of cut across the length of material to be sawed and base plate 39 is provided with a longitudinally disposed slot 59 which may be used with a clamping device to be described hereinafter, for additionally securing the guide member to the box.

A suitable clamp for securing base plate 39 at any angular position of the guide member is shown generally at 60 in Figs. 1 and 3 and in detail in Fig. 2. Referring more particularly to Fig. 2, this clamp includes a headed bolt 61 passing through slot 59 and loosely supporting thereon a plate 62 provided with a curved extension 63 which is held on bolt 61 by wing nut 64. The curved portion 63 of plate 62 is hooked beneath the bottom edge of side 11 and when wing nut 64 is tightened base plate 39 will be drawn into contact with the top of side 11.

Figs. 4 and 5 show the novel miter box of the present invention in position for ripping along the long axis of the material to be cut. In this position the guide member is first adjusted for the width of the base plate 40 of the portable power saw 41, as described above, and is then placed upon sides 11 and 12 of the miter box so that extensions 50 and 53 lie over extensions 15 and 16 respectively. Slots 51 and 54 are arranged over holes 19 and 20 and 17 and 18, respectively, so that wing bolts 65 and 66 may be screwed therein to secure the guide member to side wall 12. Scales 52 and 55 may be used to exactly position the saw blade 67 of the portable power saw 41 for any desired width of ripping cut.

When it is desired to cut at various angles across the length of the material to be sawed the guide frame is disposed across side walls 11 and 12 with a wing bolt 67 passing through either slot 56 or 57 in base plate 38 and into hole 24. The second wing bolt 68 is then passed through slots 57 or 58, as required, and into any of the holes 23, 25, 26, 27, and 28 to dispose the guide frame at angles of 90° 80°, 70°, 60° and 45°, respectively, with the long axis of the miter box. Holes 21 and 22 are used for a reverse 45° angle of cut. For these angles, and when required to prevent chattering, the clamping plate generally indicated at 60 may be employed to secure base plate 39 to the top of side 11.

Most portable power saws are provided with means for adjusting the angularity of the blade with respect to the base plate. Such a means is generally indicated in Figs. 1 and 5 at 69. Thus blade 67 may be angularly disposed at various angles with respect to base plate 40. Thus the miter box of the present invention may be utilized not only for making right angle cuts both across the length of the material to be sawed and in ripping but may also be employed to cut at various angles to the vertical both in cross cutting and in ripping.

It will now be apparent that by the present invention a novel miter box is provided which in every way satisfies the several objects detailed above.

Changes in or modifications to the above described illustrative embodiment of the miter box of the present invention may now be suggested to those skilled in the art without departing from the present inventive concept. Reference should therefore be had to the appended claims to determine the scope of this invention.

What is claimed is:

1. In a miter box for portable power saws including an open top open ended box structure having a bottom and opposed side walls, a guide frame for the portable power saw disposed upon the tops of the side walls having two opposed parallel track members to receive the power saw, means for holding said track members together in parallel relationship including a bar at each end of one of said track members extending beyond said track member away from the other track member, a longitudinal slot in each of said extensions, a lag bolt passing through each of said slots and into the top of one of the side walls to hold said guide frame to said box structure for ripping and a scale on each of said extensions for adjusting said frame with respect to said box structure for any desired width of ripping cut.

2. In a miter box for portable power saws including an open top open ended box structure having a bottom and opposed side walls, a guide frame for the portable power saw disposed upon the tops of the side walls having two opposed parallel track members to receive the power saw, means for adjusting the distance between said track members and means for securing said guide frame to the side walls at various angles to the long axis of the box structure, said means for securing said guide frame to the side walls including longitudinal slots in one of said track members, lag bolts passing through said slots and threaded into the tops of the side walls, a longitudinal slot in the other track member, and a clamp engaging said last named slot and the lower edge of the adjacent side wall.

CHESTER L. THAYER.

References Cited in the file of this patent

UNITED STATES PATENTS

| Number | Name | Date |
|---|---|---|
| 469,159 | Maroske | Feb. 16, 1892 |
| 1,457,492 | Bloodgood | June 5, 1923 |
| 1,618,341 | Howland | Feb. 22, 1927 |
| 1,832,283 | Earhart | Nov. 17, 1931 |
| 2,568,957 | Hess | Sept. 25, 1951 |
| 2,595,322 | Avery | May 6, 1952 |